(12) United States Patent
Shinohara

(10) Patent No.: US 12,153,787 B2
(45) Date of Patent: Nov. 26, 2024

(54) IMAGE FORMING APPARATUS, SHARED MACHINE, IMAGE FORMING SYSTEM, AND CONTROL METHOD OF IMAGE FORMING APPARATUS

(71) Applicant: SEIKO EPSON CORPORATION, Tokyo (JP)

(72) Inventor: Daisuke Shinohara, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/176,686

(22) Filed: Mar. 1, 2023

(65) Prior Publication Data

US 2023/0280897 A1   Sep. 7, 2023

(30) Foreign Application Priority Data

Mar. 2, 2022   (JP) .................... 2022-031947

(51) Int. Cl.
| | | |
|---|---|---|
| G06F 3/048 | (2013.01) | |
| G06F 3/0482 | (2013.01) | |
| G06F 3/04847 | (2022.01) | |
| G06F 3/04886 | (2022.01) | |
| G06F 21/31 | (2013.01) | |

(52) U.S. Cl.
CPC ........ *G06F 3/04847* (2013.01); *G06F 3/0482* (2013.01); *G06F 3/04886* (2013.01); *G06F 21/316* (2013.01)

(58) Field of Classification Search
None
See application file for complete search history.

(56) References Cited

U.S. PATENT DOCUMENTS

| | | | |
|---|---|---|---|
| 2015/0261481 A1 | 9/2015 | Takenaka | |
| 2015/0323282 A1* | 11/2015 | Bogar | F41B 9/0059 222/401 |
| 2015/0373222 A1* | 12/2015 | Wang | H04N 1/00891 358/1.13 |
| 2016/0323282 A1* | 11/2016 | Chen | H04L 63/0861 |
| 2017/0091739 A1* | 3/2017 | Toma | G06Q 20/405 |
| 2017/0094121 A1 | 3/2017 | Mizuno et al. | |
| 2017/0235529 A1 | 8/2017 | Takenaka | |
| 2017/0255342 A1* | 9/2017 | Fontaine | G06F 3/0482 |
| 2019/0361636 A1 | 11/2019 | Ren | |

FOREIGN PATENT DOCUMENTS

| | | |
|---|---|---|
| JP | 2004192219 A | 7/2004 |
| JP | 2013230557 A | 11/2013 |
| JP | 2015174299 | 4/2017 |
| JP | 2019204275 A | 11/2019 |

\* cited by examiner

*Primary Examiner* — Thanh T Vu

(74) *Attorney, Agent, or Firm* — CHIP LAW GROUP

(57) ABSTRACT

An image forming apparatus includes: a display controller that displays an operation screen including a function button for executing a function on a display section; a press determination section that determines whether the function button is short pressed or long pressed; when the press determination section determines that the function button is short pressed, a function execution section that executes the function; and when the press determination section determines that the function button is long pressed, an execute privilege setting section that sets an execute privilege of the function from a plurality of types of execute privileges in accordance with a long press time of the function button.

10 Claims, 23 Drawing Sheets

T2

| LONG PRESS TIME | EXECUTE PRIVILEGE |
|---|---|
| EQUAL TO OR MORE THAN ONE SECOND AND LESS THAN THREE SECONDS | ADMINISTRATOR PRIVILEGE |
| EQUAL TO OR MORE THAN THREE SECONDS AND LESS THAN FIVE SECONDS | CONSUMABLE SETTING PRIVILEGE |
| EQUAL TO OR MORE THAN FIVE SECONDS AND LESS THAN SEVEN SECONDS | PRINT QUALITY SETTING PRIVILEGE |
| EQUAL TO OR MORE THAN SEVEN SECONDS | NO SETTINGS |

FIG. 5

| LONG PRESS TIME | EXECUTE PRIVILEGE |
|---|---|
| EQUAL TO OR MORE THAN ONE SECOND AND LESS THAN THREE SECONDS | ADMINISTRATOR PRIVILEGE |
| EQUAL TO OR MORE THAN THREE SECONDS AND LESS THAN FIVE SECONDS | CONSUMABLE SETTING PRIVILEGE |
| EQUAL TO OR MORE THAN FIVE SECONDS AND LESS THAN SEVEN SECONDS | PRINT QUALITY SETTING PRIVILEGE |
| EQUAL TO OR MORE THAN SEVEN SECONDS | NO SETTINGS |

T3

| USER | EXECUTE PRIVILEGE |
|---|---|
| A 0 1 | ADMINISTRATOR PRIVILEGE, CONSUMABLE SETTING PRIVILEGE, PRINT QUALITY SETTING PRIVILEGE |
| B 0 2 | CONSUMABLE SETTING PRIVILEGE, PRINT QUALITY SETTING PRIVILEGE |
| C 0 3 | PRINT QUALITY SETTING PRIVILEGE |
| D 0 4 | NO EXECUTE PRIVILEGES |

| FUNCTION | EXECUTE PRIVILEGE |
|---|---|
| FIRST FUNCTION | ADMINISTRATOR PRIVILEGE |
| SECOND FUNCTION | CONSUMABLE SETTING PRIVILEGE |
| THIRD FUNCTION | PRINT QUALITY SETTING PRIVILEGE |
| FOURTH FUNCTION | NO SETTINGS |

FIG. 21

| LONG PRESS TIME | EXECUTE PRIVILEGE |
|---|---|
| EQUAL TO OR MORE THAN ONE SECOND AND LESS THAN THREE SECONDS | ADMINISTRATOR PRIVILEGE |
| EQUAL TO OR MORE THAN THREE SECONDS AND LESS THAN FIVE SECONDS | ADMINISTRATOR PRIVILEGE, CONSUMABLE SETTING PRIVILEGE |
| EQUAL TO OR MORE THAN FIVE SECONDS AND LESS THAN SEVEN SECONDS | ADMINISTRATOR PRIVILEGE, CONSUMABLE SETTING PRIVILEGE, PRINT QUALITY SETTING PRIVILEGE |
| EQUAL TO OR MORE THAN SEVEN SECONDS | NO SETTINGS |

| USER | EXECUTE PRIVILEGE |
|---|---|
| A 0 1 | ADMINISTRATOR PRIVILEGE |
| B 0 2 | CONSUMABLE SETTING PRIVILEGE |
| C 0 3 | PRINT QUALITY SETTING PRIVILEGE |
| D 0 4 | NO EXECUTE PRIVILEGES |

IMAGE FORMING APPARATUS, SHARED MACHINE, IMAGE FORMING SYSTEM, AND CONTROL METHOD OF IMAGE FORMING APPARATUS

The present application is based on, and claims priority from JP Application Serial Number 2022-031947, filed Mar. 2, 2022, the disclosure of which is hereby incorporated by reference herein in its entirety.

BACKGROUND

1. Technical Field

The present disclosure relates to an image forming apparatus, a shared equipment, an image forming system, and a control method of an image forming apparatus.

2. Related Art

As disclosed in JP-A-2015-174299, in an image forming apparatus shared by a plurality of users, a method is known in which by setting an execute privilege of a part of functions, only a user who has the execute privilege is able to execute the function, such as a setting-value change function, or the like. For example, in the image forming apparatus, a first function is set so as to be executed only by a user who has an administrator privilege, and a second function is set so as to be executed by a user who has an administrator privilege or a consumable setting privilege, or the like.

In an image forming apparatus of this type, what kind of execute privilege is set to which function differs greatly depending on a use scene of the image forming apparatus. Accordingly, it is requested to make it possible to perform flexible settings. Such an image forming apparatus thus often uses a method of setting an execute privilege for each function by using a dedicated screen for setting an execute privilege. However, in a method of setting an execute privilege by using the dedicated screen, it needs to take time and effort, for example, to open a dedicated screen, to search the functions displayed on the dedicated screen for a function to which an execute privilege is set, and the like. This requires troublesome operations.

SUMMARY

According to an aspect of the present disclosure, there is provided an image forming apparatus including: a display controller that displays an operation screen including a function button for executing a function on a display section; and an execute privilege setting section that sets an execute privilege of the function from a plurality of types of execute privileges in accordance with a long press time of the function button.

According to another aspect of the present disclosure, there is provided a shared equipment including: a display controller that displays an operation screen including a function button for executing a function on a display section; a press determination section that determines whether the function button is short pressed or long pressed; when the press determination section determines that the function button is short pressed, a function execution section that executes the function; and when the press determination section determines that the function button is long pressed, an execute privilege setting section that sets an execute privilege of the function from a plurality of types of execute privileges in accordance with a long press time of the function button.

According to still another aspect of the present disclosure, there is provided an image forming system including an image forming apparatus and a server connected to the image forming apparatus so as to be configured to communicate with the image forming apparatus, the image forming apparatus including: a display controller that displays an operation screen including a function button for executing a function on a display section; a press determination section that determines whether the function button is short pressed or long pressed; when the press determination section determines that the function button is short pressed, a function execution section that executes the function; and when the press determination section determines that the function button is long pressed, an execute privilege setting section that sets an execute privilege of the function from a plurality of types of execute privileges in accordance with a long press time of the function button, the server including a server storage section that stores an execute privilege of the function set by the execute privilege setting section.

According to still another aspect of the present disclosure, there is provided a control method of an image forming apparatus, the control method causing the image forming apparatus to execute the processing including: displaying an operation screen including a function button for executing a function on a display section; determining whether the function button is short pressed or long pressed; when a determination is made that the function button is short pressed, executing the function; and when a determination is made that the function button is long pressed, setting an execute privilege of the function from a plurality of types of execute privileges in accordance with a long press time of the function button.

BRIEF DESCRIPTION OF THE DRAWINGS

FIG. 5 is a diagram illustrating an example of a second table.

FIG. 21 is a diagram illustrating another example of the second table.

DESCRIPTION OF EXEMPLARY EMBODIMENTS

Figure 1:
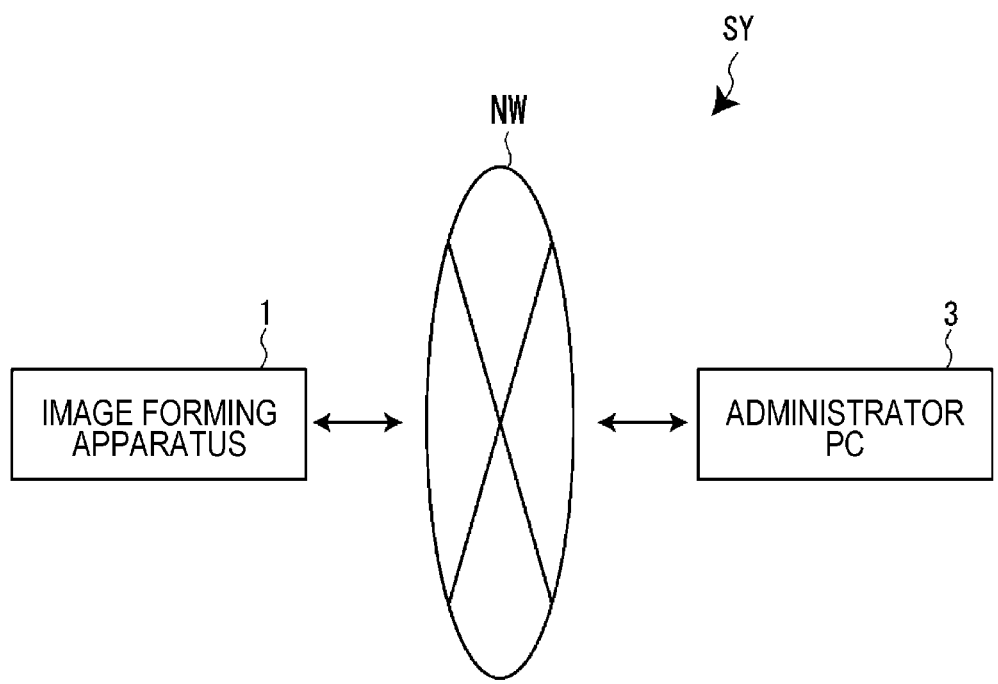
FIG. 1 is a diagram illustrating an example of an image forming system.

In the following, a description will be given of an image forming apparatus according to an embodiment, a shared equipment, an image forming system, and a control method of an image forming apparatus with reference to the accompanying drawings. FIG. 1 is a diagram illustrating an example of an image forming system SY. The image forming system SY includes an image forming apparatus 1 and an administrator PC (personal computer) 3, which are connected with each other via a network NW. The network NW is, for example, a LAN (local area network).

The image forming apparatus 1 is a complex machine having, for example, a scanner function, a printer function, a copy function, and the like. The image forming apparatus 1 is an example of a "shared equipment". The image forming apparatus 1 is installed in an office or the like, and shared by a plurality of users. Each user becomes able to use the image forming apparatus 1 by getting user authentication by using an authentication card on which an authentication code is recorded.

Figure 2:
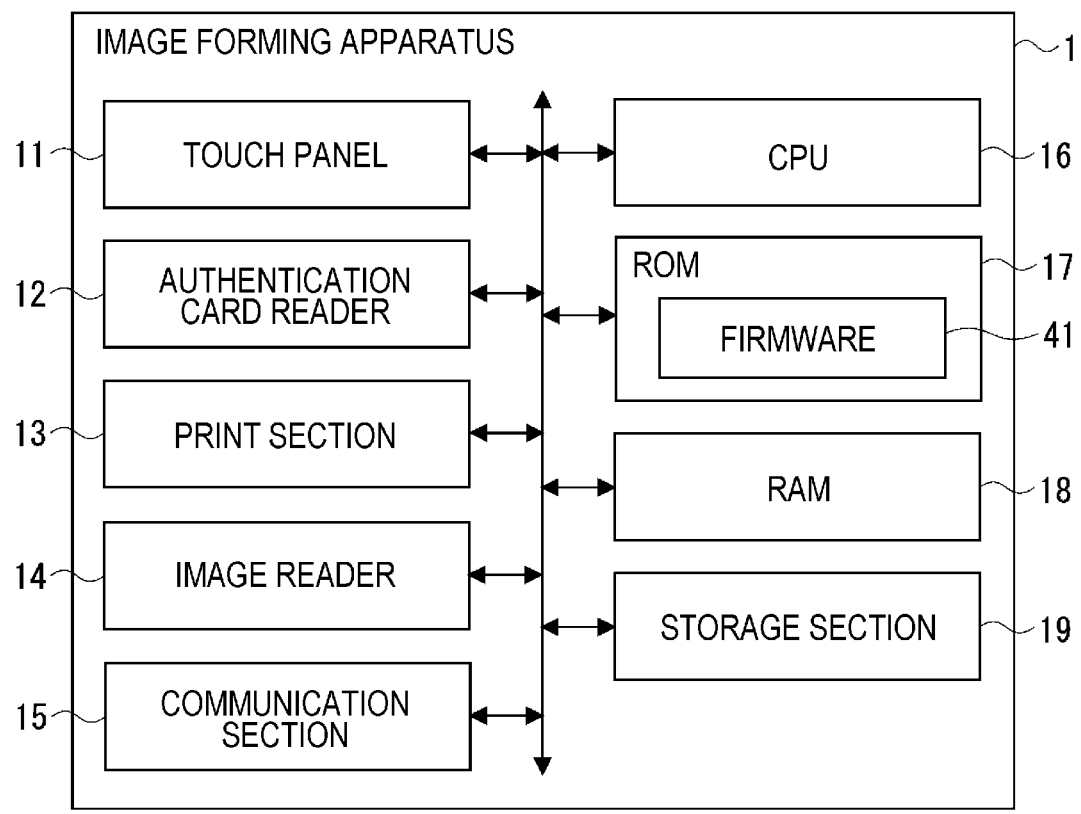
FIG. 2 is a block diagram illustrating the hardware configuration of an image forming apparatus.

As illustrated in FIG. 2, the image forming apparatus 1 is able to perform various functions by performing the corresponding operations on the touch panel 11 by a user. Also, the image forming apparatus 1 is able to set an execute privilege of a function by using a corresponding one of the function buttons B illustrated in FIG. 9. That is to say, when one of the function buttons B is short pressed, the image forming apparatus 1 performs a corresponding one of the functions assigned to the one of the function buttons B. Whereas when one of the function buttons B is long pressed, the image forming apparatus 1 sets a corresponding one of the execute privileges assigned to the one of the function buttons B in accordance with the long press time. A detailed description will be given later.

The administrator PC 3 is a PC operated by a user who has an administrator privilege. Hereinafter a "user who has an administrator privilege" is referred to as an "administrator". The administrator privilege is an example of the "predetermined execute privilege". The administrator creates a first table T1 illustrated in FIG. 4, a second table T2 illustrated in FIG. 5, and a third table T3 illustrated in FIG. 6, which are described later, by using the administrator PC 3.

Also, the administrator sets an execute privilege by long pressing one of the function buttons B of the image forming apparatus 1. On the other hand, a user other than the administrator, that is to say, a user who does not have the administrator privilege is prohibited from setting a corresponding one of the execute privileges of the image forming apparatus 1.

FIG. 2 is a block diagram illustrating the hardware configuration of the image forming apparatus 1. The image forming apparatus 1 includes a touch panel 11, an authentication card reader 12, a print section 13, an image reader 14, a communication section 15, a CPU (central processing unit) 16, a ROM (read only memory) 17, a RAM (random access memory) 18, and a storage section 19 as the hardware configuration. The touch panel 11 is an example of the "display section".

Figure 9:
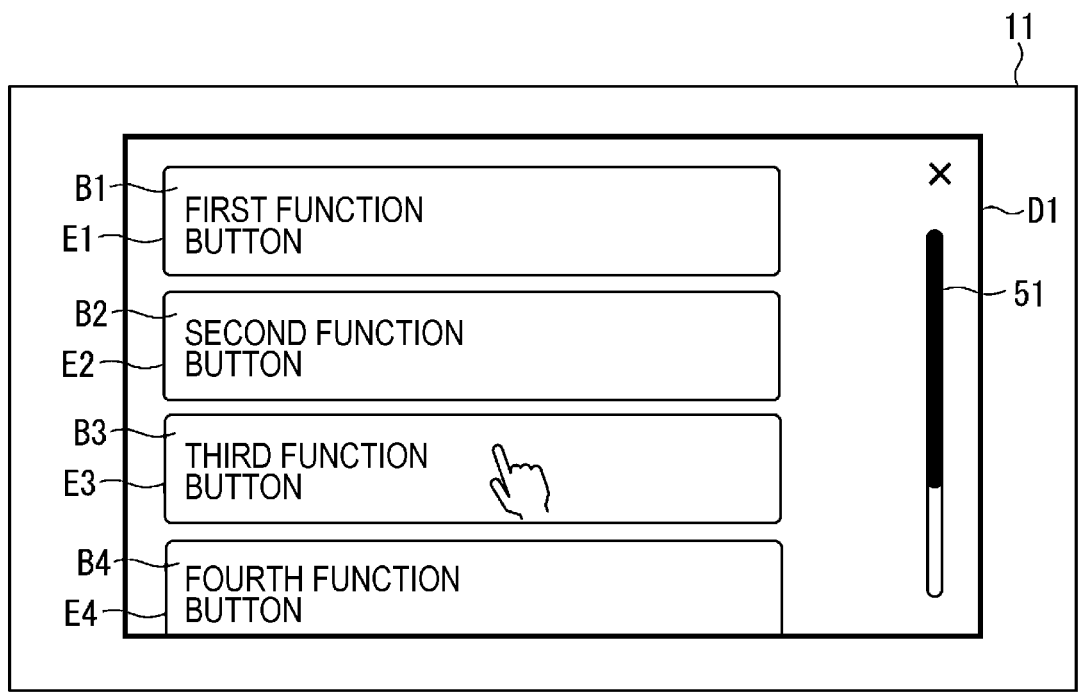
FIG. 9 is a diagram illustrating a display example of a first operation screen before a function button is pressed.

The touch panel 11 displays various kinds of information such as an operation screen D illustrated in FIG. 9, and the like, and receives various operations by the user on the operation screen D. In the present embodiment, the touch panel 11 displays, as the operation screen D, a first operation screen D1 and a second operation screen D2 illustrated in FIG. 16, which is displayed when a third function button B3 is short pressed on the first operation screen D1.

The authentication card reader 12 reads an authentication card of a user. The authentication card is, for example, an IC (integrated circuit) card, and an authentication code is recorded on the IC chip. The authentication card reader 12 reads an authentication card so as to obtain an authentication code.

The print section 13 prints on a print medium such as copy paper, or the like. The print section 13 is used for a printer function or a copy function. In this regard, the printing method of the print section 13 may be any kind, for example, an ink jet method, an electrophotographic method, or the like.

The image reader 14 reads a document. The image reader 14 is used for a scanner function or a copy machine function. In this regard, the reading method of the image reader 14 may be a sheet feed method or a flat bed method.

The communication section 15 communicates with the administrator PC 3 via the network NW.

The CPU 16 loads various control programs stored in the ROM 17 such as firmware 41, or the like in the RAM 18 so as to perform various kinds of control. In this regard, a hardware circuit such as an ASIC (application specific integrated circuit), or the like may be used as a processor replacing the CPU 16. Also, the processor may be operated in combination with one or more CPUs and a hardware circuit such as an ASIC, or the like.

Figure 19:
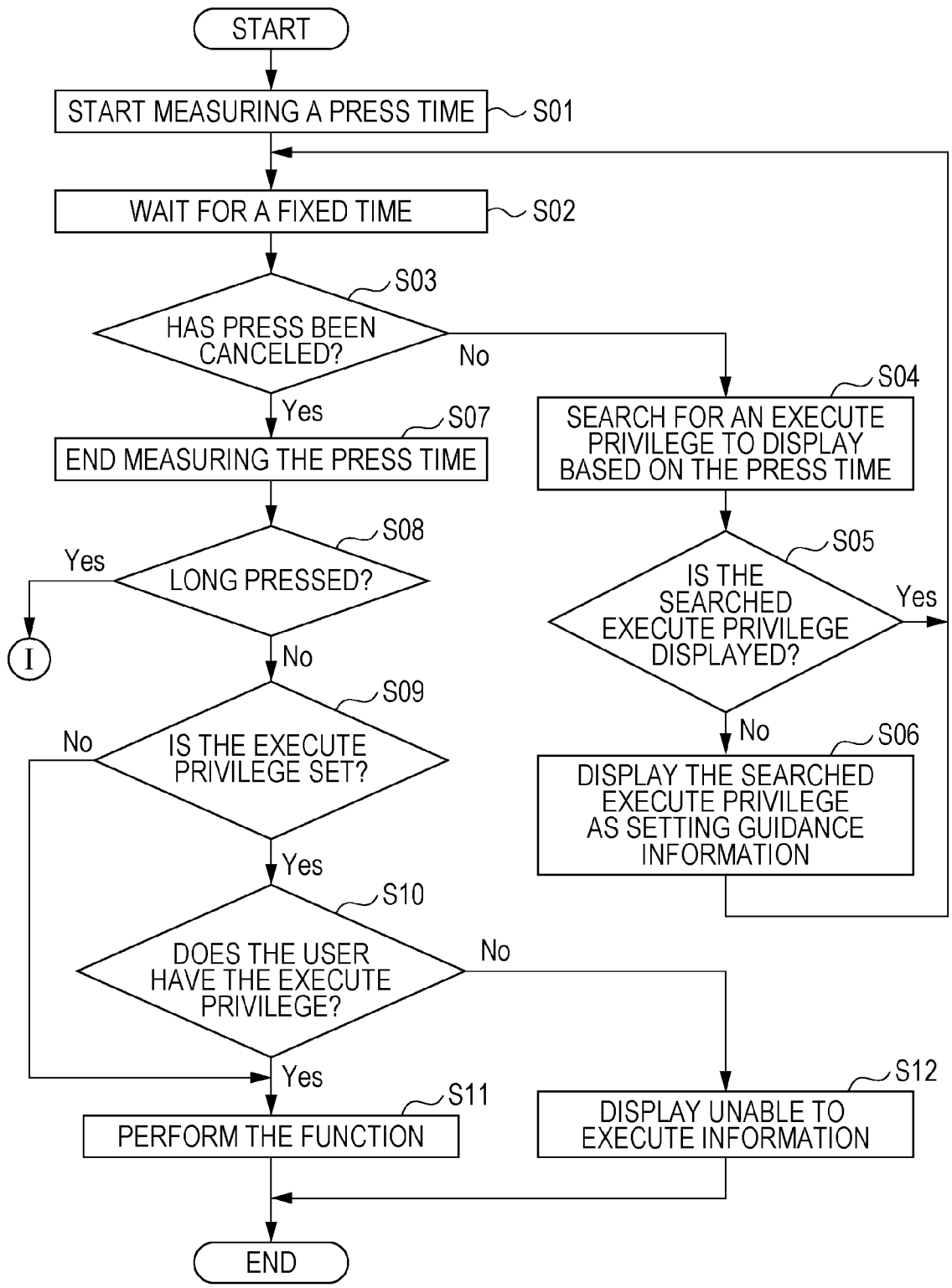
FIG. 19 is a flowchart illustrating function button press-time processing.
Figure 20:
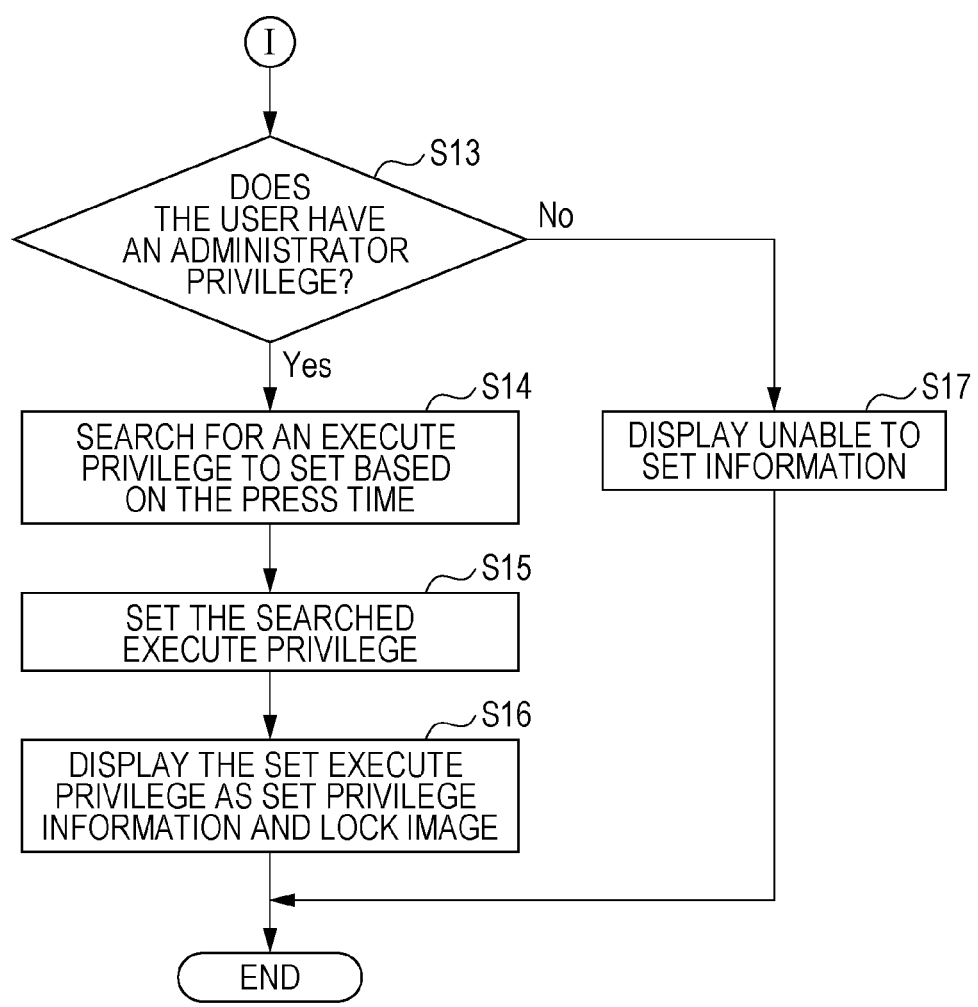
FIG. 20 is a flowchart following FIG. 19.

The ROM 17 is a nonvolatile storage medium and stores the firmware 41. As illustrated in FIG. 19 and FIG. 20, the firmware 41 is software for performing function button press-time processing described later and causing the image forming apparatus 1 to communicate with the administrator PC 3.

The RAM 18 is a volatile storage medium and is used as a work area of the CPU 16.

The storage section 19 is a rewritable and nonvolatile storage medium and stores various tables T.

Figure 3:
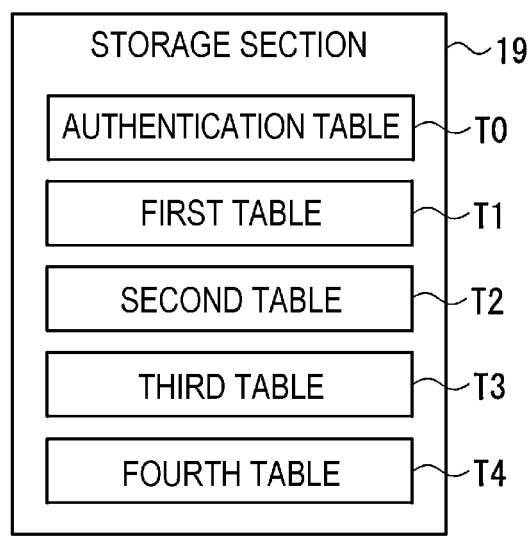
FIG. 3 is an explanatory diagram of a storage section.

FIG. 3 is an explanatory diagram of the storage section 19. The storage section 19 stores an authentication table T0, a first table T1 illustrated in FIG. 4, a second table T2 illustrated in FIG. 5, a third table T3 illustrated in FIG. 6, and a fourth table T4 illustrated in FIG. 7.

The authentication table T0 is a table for performing user authentication. Although the illustration of the authentication table T0 is omitted, the authentication table T0 is a table associating a user ID of a user with an authentication code.

As described above, the first table T1, the second table T2, and the third table T3 are created by the administrator by using the administrator PC 3. The administrator PC 3 transmits these created tables T to the image forming apparatus 1 via the network NW. In this regard, when the administrator PC 3 is accessible to the storage section 19 of the image forming apparatus 1, the administrator PC 3 may be able to directly rewrite the information in the tables T. On the other hand, the fourth table T4 stores information set by the administrator by using the image forming apparatus 1.

Figure 4:
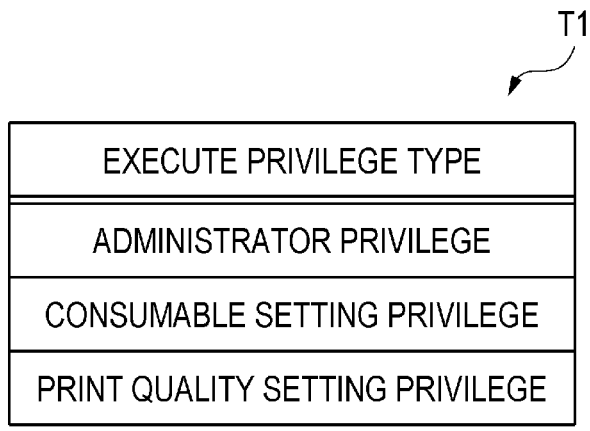
FIG. 4 is a diagram illustrating an example of a first table.

FIG. 4 is a diagram illustrating an example of a first table T1. The first table T1 is a table indicating the type of an execute privilege. In the example in FIG. 4, an "administrator privilege", a "consumable setting privilege", and a "print quality setting privilege" are set as types of the execute privilege. The "administrator privilege" is a privilege to be executed by an administrator. Also, the "consumable setting privilege" is a privilege that permits the setting function concerning consumables. Also, the "print quality setting privilege" is a privilege that permits the execution of the setting function concerning the print quality. In this regard, an execute privilege is set in the second table T2, the third table T3, and the fourth table T4, which will be described later, from the types of the execute privileges set in the first table T1.

FIG. 5 is a diagram illustrating an example of the second table T2. The second table T2 is a table associating a long press time and an execute privilege. The "long press time" is a time period during which the function button B is long pressed. Also, an "execute privilege" recorded in the second table T2 is an execute privilege set when the function button B is long pressed for an associated time.

In the example in FIG. 5, when the long press time of the function button B is equal to or more than one second and less than three seconds, the "administrator privilege" is set to the function assigned to the function button B. That is to say, in this case, a user who has the "administrator privilege" as the execute privilege becomes able to perform the function assigned to the function button B. Also, in the example in FIG. 5, when the long press time of the function button B is equal to or more than three seconds and less than five seconds, the "consumable setting privilege" is set to the function assigned to the function button B. That is to say, in this case, a user who has the "consumable setting privilege" as the execute privilege becomes able to perform the function assigned to the function button B.

Also, in the example in FIG. 5, when the long press time of the function button B is equal to or more than five seconds and less than seven seconds, "print quality setting privilege" is set to the function assigned to the function button B. That is to say, in this case, a user who has the "print quality setting privilege" as the execute privilege becomes able to perform the function assigned to the function button B. Also, in the example in FIG. 5, when the long press time of the function button B is equal to or more than seven seconds, the execute privilege is not set to the function assigned to the function button B. That is to say, in this case, all the users become able to perform the function assigned to the function button B regardless of the execute privilege held.

In this regard, in the example in FIG. 5, one second is an example of the "first time", and three seconds is an example of the "second time", and five seconds is an example of the "third time". Also, the "administrator privilege" is an example of the "first execute privilege", and the "consumable setting privilege" is an example of the "second execute privilege".

Also, as illustrated in the example in FIG. 5, when the administrator long presses for equal to or more than a predetermined time, it is desirable not to set an execute privilege in the second table T2. Thereby, when the administrator has mistakenly long pressed a function button B, or when a long press time exceeds the long press time for setting an execute privilege during long pressing, it is possible to suppress unintended setting of the execute privilege that is mistakenly set by continuing to long press for a predetermined time or more.

Figure 6:
FIG. 6 is a diagram illustrating an example of a third table.

FIG. 6 is a diagram illustrating an example of the third table T3. The third table T3 is a table associating a user and an execute privilege. The third table T3 is an example of the "table". In the third table T3, a user ID is recorded as information that identifies a "user". Also, an "execute privilege" recorded in the third table T3 is an execute privilege held by the user with the associated user ID.

In the example in FIG. 6, a user with the user ID "A01" has the "administrator privilege", the "consumable setting privilege" and the "print quality setting privilege". That is to say, the user with the user ID "A01" is an administrator, and is able to perform a function to which any one of the execute privileges is set among the "administrator privilege", the "consumable setting privilege" and the "print quality setting privilege". Also, in the example in FIG. 6, a user with the user ID "B02" has privileges of the "consumable setting privilege" and the "print quality setting privilege". That is to say, the user with the user ID "B02" is not able to perform a function to which the "administrator privilege" is set, and able to perform a function to which an execute privilege of the "consumable setting privilege" or the "print quality setting privilege" is set.

Also, in the example in FIG. 6, a user with the user ID "C03" has the "print quality setting privilege". That is to say, a user with the user ID "C03" is not able to perform a function to which the "administrator privilege" or the "consumable setting privilege" is set, and is able to perform a function to which the "print quality setting privilege" is set. Also, in the example in FIG. 6, a user with user ID "D04" does not have an execute privilege. That is to say, the user with the user ID "D04" is not able to perform a function to which an execute privilege is set.

Figure 7:
FIG. 7 is a diagram illustrating an example of a fourth table.

FIG. 7 is a diagram illustrating an example of the fourth table T4. The fourth table T4 a table associating a function and an execute privilege. An "execute privilege" recorded in the fourth table T4 is an execute privilege that is set to a corresponding one of the associated functions.

In the example in FIG. 7, the "administrator privilege" is set to a "first function" as the execute privilege. That is to say, a user with the "administrator privilege" is able to perform the "first function", and a user who does not have the "administrator privilege" is not able to perform the "first function". Also, in the example in FIG. 7, the "consumable setting privilege" is set to the "second function" as the execute privilege. That is to say, a user with the "consumable setting privilege" is able to perform the "second function", and a user without the "consumable setting privilege" is not able to perform the "second function".

Also, in the example in FIG. 7, the "print quality setting privilege" is set to the "third function" as the execute privilege. That is to say, a user with the "print quality setting privilege" is able to execute the "third function", and a user who does not have the "print quality setting privilege" is not able to execute the "third function". Also, in the example in FIG. 7, no execute privileges are set to the "fourth function". That is to say, all the users are able to perform the "fourth function" regardless of the execute privilege held.

In this regard, in the example in FIG. 7, for the "first function", a function that is desirable to be executed only by an administrator is assumed. For example, the assumed function is a function of displaying a job history of the image forming apparatus 1, a function of displaying a print log function, and the like. Also, for the "second function", the assumed function is a function of setting a print medium such as copy paper, and the like, and a function of setting a coloring agent such as ink, toner, or the like. Also, for the "third function", the assumed function is a function regarding setting of a print quality such as image quality adjustment, color adjustment, or the like.

Figure 8:
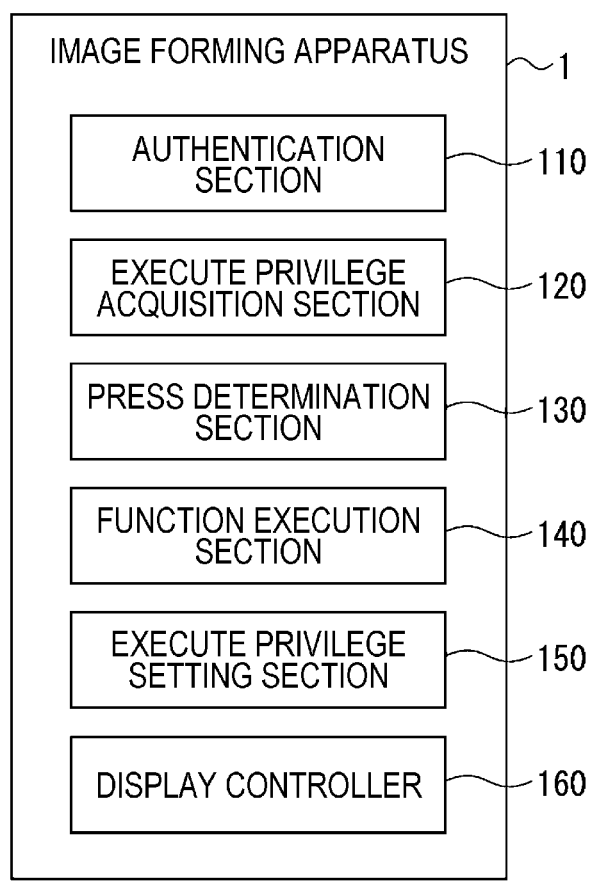
FIG. 8 is a block diagram illustrating the functional configuration of the image forming apparatus.

FIG. 8 is a block diagram illustrating the functional configuration of the image forming apparatus 1. The image forming apparatus 1 includes an authentication section 110, an execute privilege acquisition section 120, a press determination section 130, a function execution section 140, an execute privilege setting section 150, and a display controller 160 as functional configurations. These functions are functions all realized by the execution of the firmware 41 by the CPU 16.

The authentication section 110 authenticates a user. More specifically, the authentication section 110 reads an authentication card by the authentication card reader 12 to obtain an authentication code, and refers to the authentication table T0 illustrated in FIG. 3. When a user ID associated with the authentication code is included in the authentication table TO, the authentication section 110 authenticates the user. In this case, the authenticated user becomes able to use the image forming apparatus 1. On the other hand, when a user ID associated with the authentication code is not included in the authentication table T0, the authentication section 110 does not authenticate the user. In this case, unauthenticated user is prohibited from using the image forming apparatus 1.

The execute privilege acquisition section 120 refers to the third table T3 illustrated in FIG. 6, and obtains an execute privilege associated with the user authenticated by the authentication section 110. When a user is authenticated by the authentication section 110, the execute privilege acquisition section 120 refers to the third table T3, and obtains an execute privilege associated with the user ID of the authenticated user.

The press determination section 130 determines whether the function button B displayed on the operation screen D is short pressed or long pressed. When the press time of the function button B is less than a minimum time of the long press time stored in the second table T2, the press determination section 130 determines that the function button B has been short pressed. That is to say, when the second table T2 illustrated in FIG. 5 is stored in the storage section 19, when the press time of the function button B is less than one second, the press determination section 130 determines that the function button B has been short pressed, and when the press time of the function button B is equal to or longer than one second, the press determination section 130 determines that the function button B has been long pressed. In the present embodiment, the operation screen D is displayed on the touch panel 11, and thus the press determination section 130 measures the time period during which the button area E of the function button B illustrated in FIG. 9 or the like that is displayed on the touch panel 11 is touched as a press time.

When the press determination section 130 determines that the function button B has short pressed, the function execution section 140 performs the function assigned to the function button B. However, when the execute privilege of the function is set by an execute privilege setting section 150 described later, the function execution section 140 determines whether or not to perform the function by the short press of the function button B in accordance with the set execute privilege and the execute privilege obtained by the execute privilege acquisition section 120. That is to say, when the function button B is short pressed, and the execute privilege obtained by the execute privilege acquisition section 120 includes an execute privilege set for the function assigned to the function button B, the function execution section 140 performs the function. On the other hand, when the function button B is short pressed, but the execute privilege obtained by the execute privilege acquisition section 120 does not include the execute privilege set to the function assigned to the function button B, the function execution section 140 does not perform the function.

In this regard, the function execution section 140 determines whether or not the execute privilege is set to the function assigned to the pressed function button B by referring to the fourth table T4. Also, the function execution section 140 obtains the execute privilege set to the function by referring to the fourth table T4. Also, when the function button B to which a function having no execute privileges set is assigned is pressed, the function execution section 140 performs the function regardless of the execute privilege obtained by the execute privilege acquisition section 120.

When the press determination section 130 determines that the function button B has been long pressed, the execute privilege setting section 150 sets the execute privilege of a function from a plurality of types of execute privileges in accordance with the long press time of the function button B. For example, when the long press time of the function button B is equal to or more than the first time and less than the second time, the execute privilege setting section 150 sets the first execute privilege. When the long press time of the function button B is equal to or more than the second time and less than the third time, the execute privilege setting section 150 sets a second execute privilege different from the first execute privilege.

The execute privilege setting section 150 refers to the second table T2 and sets the execute privilege of the function. That is to say, the execute privilege setting section 150 refers to the second table T2 and sets an execute privilege associated with the long press time of the function button B to the execute privilege of the function assigned to the function button B as the execute privilege. The execute privilege setting section 150 records the set execute privilege in the fourth table T4.

Also, the execute privilege setting section 150 determines whether or not to set the execute privilege of a function depending on whether or not a predetermined execute privilege has been obtained by the execute privilege acquisition section 120. In the present embodiment, a predetermined execute privilege is the "administrator privilege". That is to say, when the "administrator privilege" is obtained by the execute privilege acquisition section 120, the execute privilege setting section 150 sets the execute privilege of a function in accordance with the long press time of the function button B. When the "administrator privilege" is not obtained by the execute privilege acquisition section 120, the execute privilege setting section 150 does not set execute privilege of a function even in a case in which the function button B is long pressed.

Figure 13:
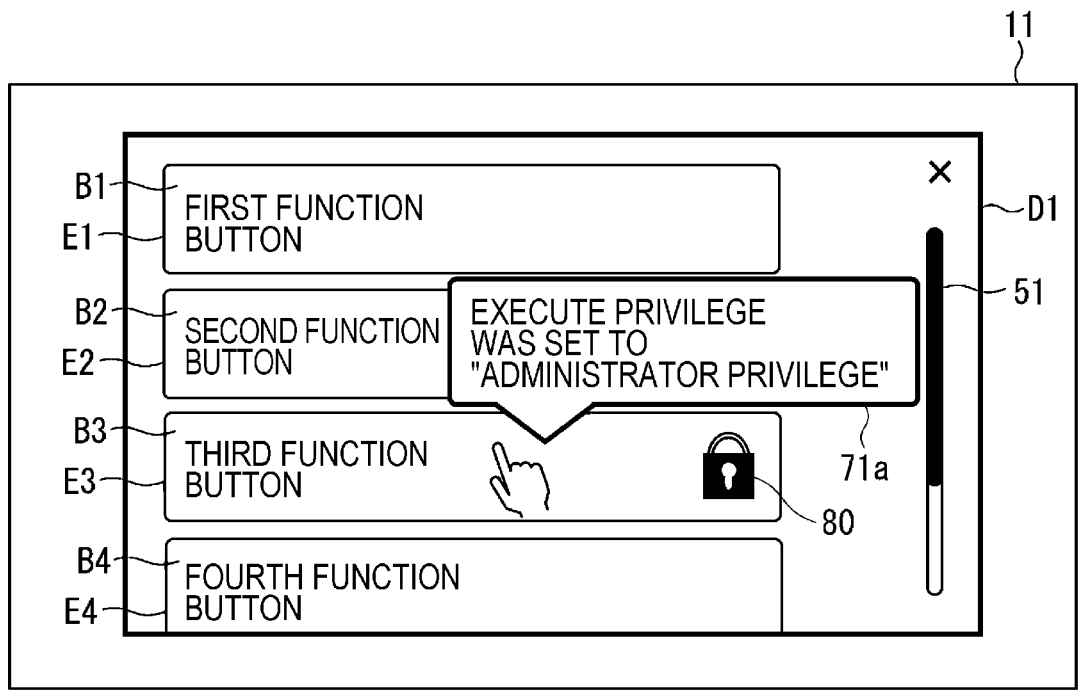
FIG. 13 is a diagram illustrating the first operation screen when long press is canceled while the function button is long pressed for equal to or more than one second and less than three seconds.

The display controller 160 displays the operation screen D including the function button B on the touch panel 11. Also, when the long press of the function button B is canceled, as illustrated in FIG. 13, or the like, the display controller 160 displays setting privilege information 71 illustrating the type of the execute privilege set by the execute privilege setting section 150 on the touch panel 11.

Figure 10:
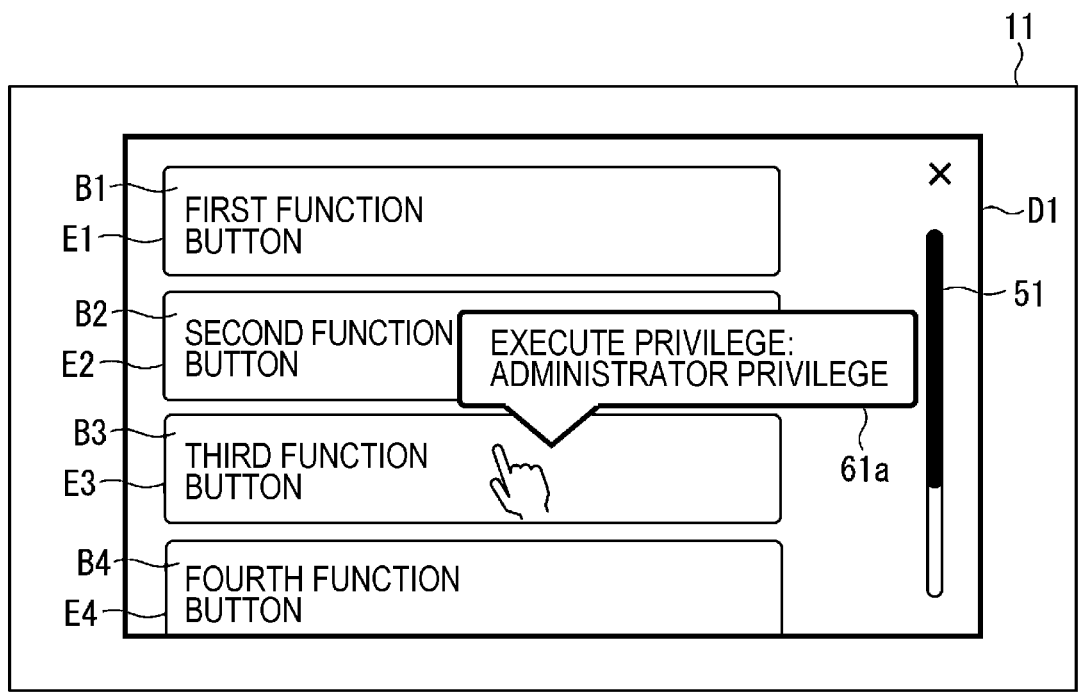
FIG. 10 is a diagram illustrating the first operation screen when the function button is long pressed for equal to or more than one second and less than three seconds.

Also, the display controller 160 displays setting guidance information 61 illustrating that the first execute privilege is set on the touch panel 11 as illustrated in FIG. 10 and the like while the long press time of the function button B is equal to or more than the first time and less than the second time. Also, the display controller 160 displays setting guidance information 61 illustrating that the second execute privilege different from the first execute privilege is set on the touch panel 11 while the long press time of the function button B is equal to or more than the second time and less than the third time.

Also, when the execute privilege of the function is set by the execute privilege setting section 150, the display controller 160 displays a set image illustrating that the execute privilege of the function is set in the button area E of the function button B. In the present embodiment, as illustrated in FIG. 13 and the like, the display controller 160 displays a lock image 80 imitating a lock as the set image on the touch panel 11.

Figure 17:
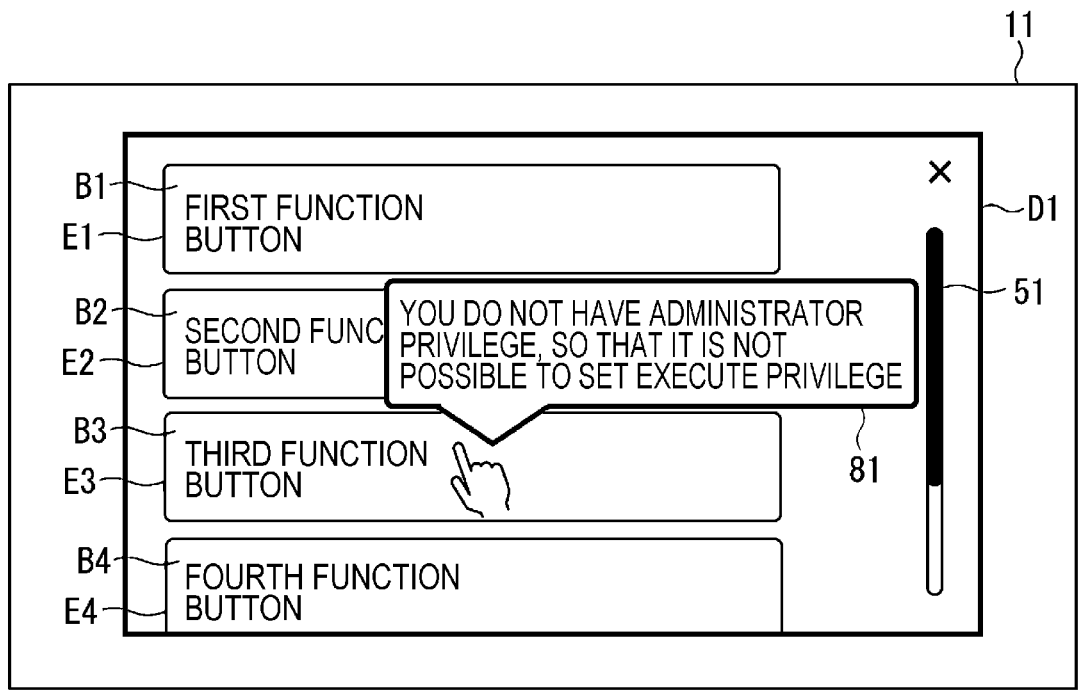
FIG. 17 is a diagram illustrating the first operation screen when a function button is long pressed by a user who does not have an administrator privilege and then long press is canceled.
Figure 18:
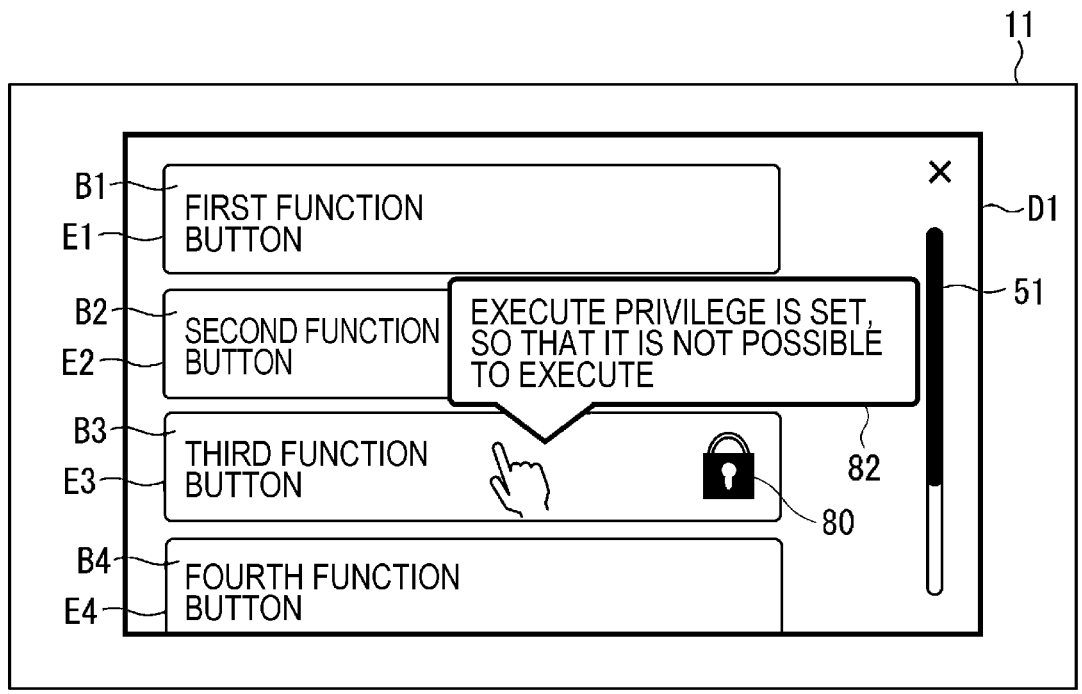
FIG. 18 is a diagram illustrating the first operation screen when a function button is short pressed by a user who does not have an execute privilege of a function and then short press is canceled.

Also, when the "administrator privilege" is not obtained by the execute privilege acquisition section 120, and the function button B is long pressed, as illustrated in FIG. 17, the display controller 160 displays unable to set information 81 indicating that the execute privilege is unable to be set on the touch panel 11. Also, when the function button B is short pressed, and the execute privilege obtained by the execute privilege acquisition section 120 does not include the execute privilege set for the function assigned to the function button B, as illustrated in FIG. 18, the display controller 160 displays unable to execute information 82 indicating that the function is unable to be executed on the touch panel 11.

A description will be given of the display control by the display controller 160 with specific examples by referring from FIG. 9 to FIG. 18. FIG. 9 is a diagram illustrating a display example of the first operation screen D1. A plurality of function buttons B including a first function button B1, a second function button B2, a third function button B3, and a fourth function button B4 are displayed on the first operation screen D1. The other function buttons B that are not displayed on the first operation screen D1 illustrated in FIG. 9 are able to be displayed by operating a scroll bar 51.

In this regard, it is assumed that the first function, the second function, the third function, and the fourth function are assigned to the first function button B1, the second function button B2, the third function button B3, and the fourth button B4 respectively. Also, the areas to be pressed of the first function button B1, the second function button B2, the third function button B3, and the fourth function button B4 are referred to as a first button area E1, a second button area E2, a third button area E3, and a fourth button area E4 respectively.

Hereinafter a description will be given on the assumption that the third function button B3 has been pressed on the first operation screen D1. In this regard, a right hand image illustrated in FIG. 9 and the other drawings indicates the press position of a user, and is not actually displayed on the operation screen D. Also, it is assumed that the second table T2 illustrated in FIG. 5 is stored in the storage section 19 of the image forming apparatus 1. Further, it is assumed that a user who has performed the operation illustrated from FIG. 10 to FIG. 15 has the "administrator privilege".

In this regard, the first function button B1 is, for example, a button for displaying a setting screen for the administrator. Also, the second function button B2 is, for example, a button for displaying a screen for performing paper setting. Also, the third function button B3 is, for example, a button for displaying the second operation screen D2 for performing the print quality setting illustrated in FIG. 16. Also, the fourth function button B4 is, for example, a button for displaying a screen for performing a scanner function. FIG. 10 is a diagram illustrating a display example of the first operation screen D1 when the third function button B3 is long pressed for equal to or more than one second and less than three seconds. In this case, the display controller 160 displays first setting guidance information 61a indicating that the "administrator privilege" is set on the first operation screen D1. In this manner, the display controller 160 displays the first setting guidance information 61a on the first operation screen D1 for about two seconds when the press time of the third function button B3 is equal to or more than one second and less than three seconds.

Figure 11:
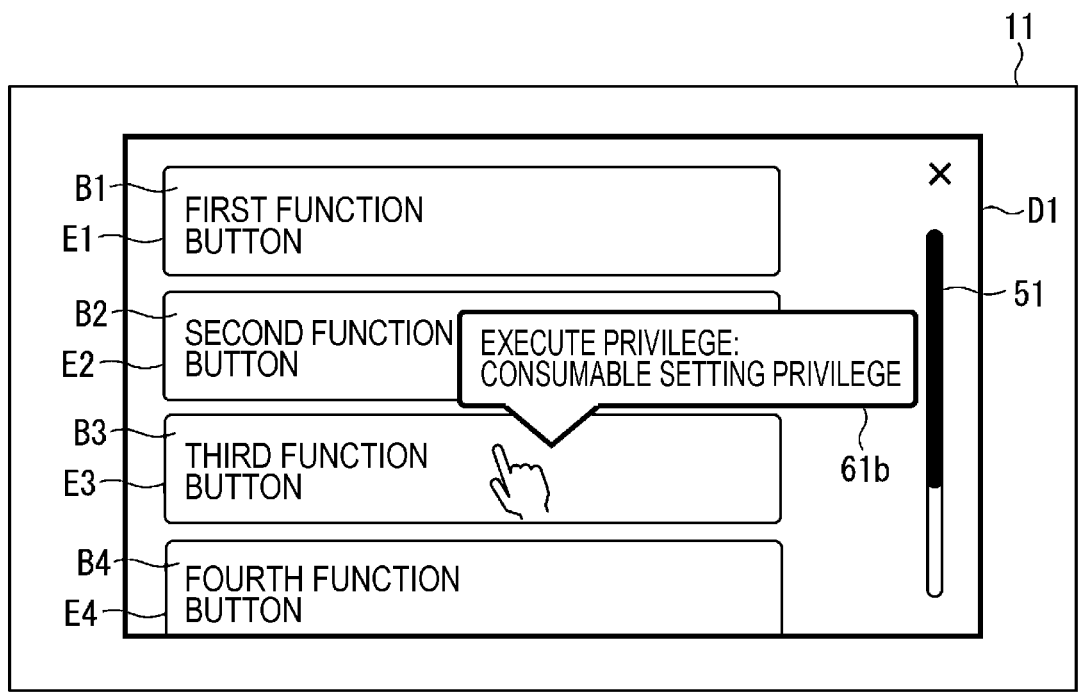
FIG. 11 is a diagram illustrating the first operation screen when the function button is long pressed for equal to or more than three seconds and less than five seconds.

FIG. 11 is a diagram illustrating a display example of the first operation screen D1 when the third function button B3 is long pressed for equal to or more than three seconds and less than five seconds. In this case, the display controller 160 displays second setting guidance information 61b indicating that the "consumable setting privilege" is set on the first operation screen D1. In this manner, the display controller 160 displays the second setting guidance information 61b for about two seconds when the press time of the third function button B3 is equal to or more than three seconds and less than five seconds on the first operation screen D1.

Figure 12:
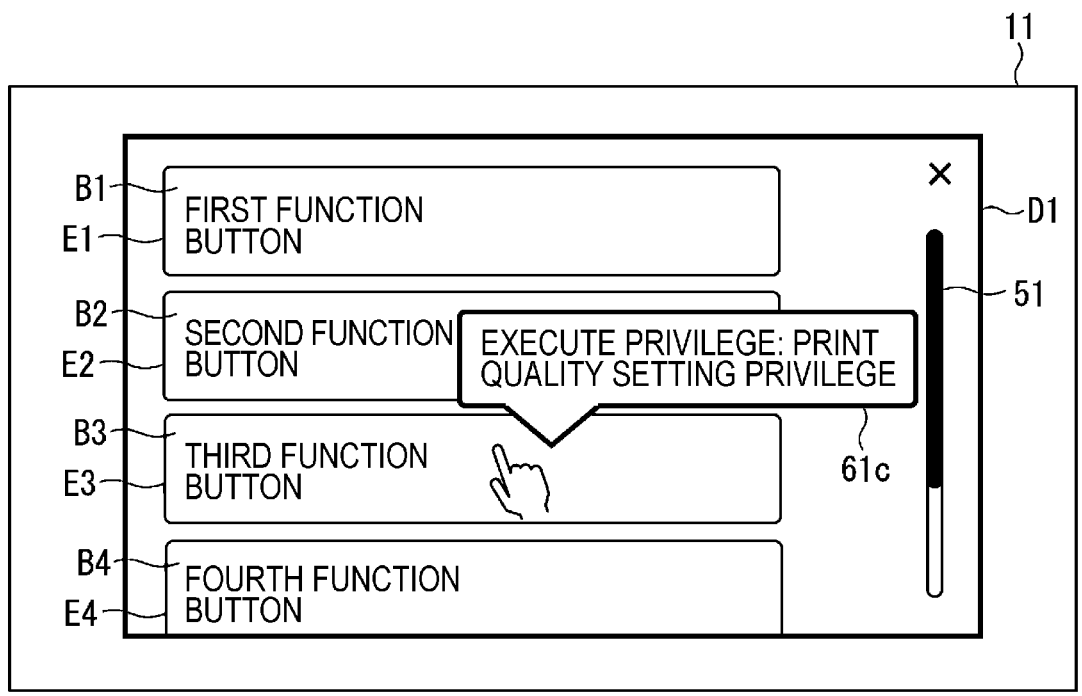
FIG. 12 is a diagram illustrating the first operation screen when the function button is long pressed for equal to or more than five seconds and less than seven seconds.

FIG. 12 is a diagram illustrating a display example of the first operation screen D1 when the third function button B3 is long pressed for equal to or more than five seconds and less than seven seconds. In this case, the display controller 160 displays third setting guidance information 61c indicating that the "print quality setting privilege" is set on the first operation screen D1. In this manner, the display controller 160 displays the third setting guidance information 61c for about two seconds when the press time of the third function button B3 equal to or more than five seconds and less than seven seconds on the first operation screen D1.

In this regard, when the press time of the third function button B3 becomes equal to or more than seven seconds, the display controller 160 hides the setting guidance information 61.

FIG. 13 is a diagram illustrating a display example of the first operation screen D1 when the long press is canceled while the long press time of the third function button B3 is equal to or more than one second and less than three seconds. In this case, the display controller 160 displays the first setting privilege information 71a indicating that the execute privilege has been set to the "administrator privilege" on the first operation screen D1. When a fixed time passes from the start of the display of the first setting privilege information 71a, the display controller 160 hides the first setting privilege information 71a.

When the long press of the third function button B3 is canceled, the display controller 160 displays the lock image 80 indicating that the execute privilege is set in the third button area E3, which is a button area E of the third function button B3. The display controller 160 displays the lock image 80 all the time while the execute privilege of the function is set.

In this regard, when the execute privilege of a function is set, the display controller 160 displays the same lock image 80 regardless of the type of the set execute privilege. Accordingly, in the description of FIG. 14 and FIG. 15 described later, the description of the lock image 80 will be omitted.

Figure 14:
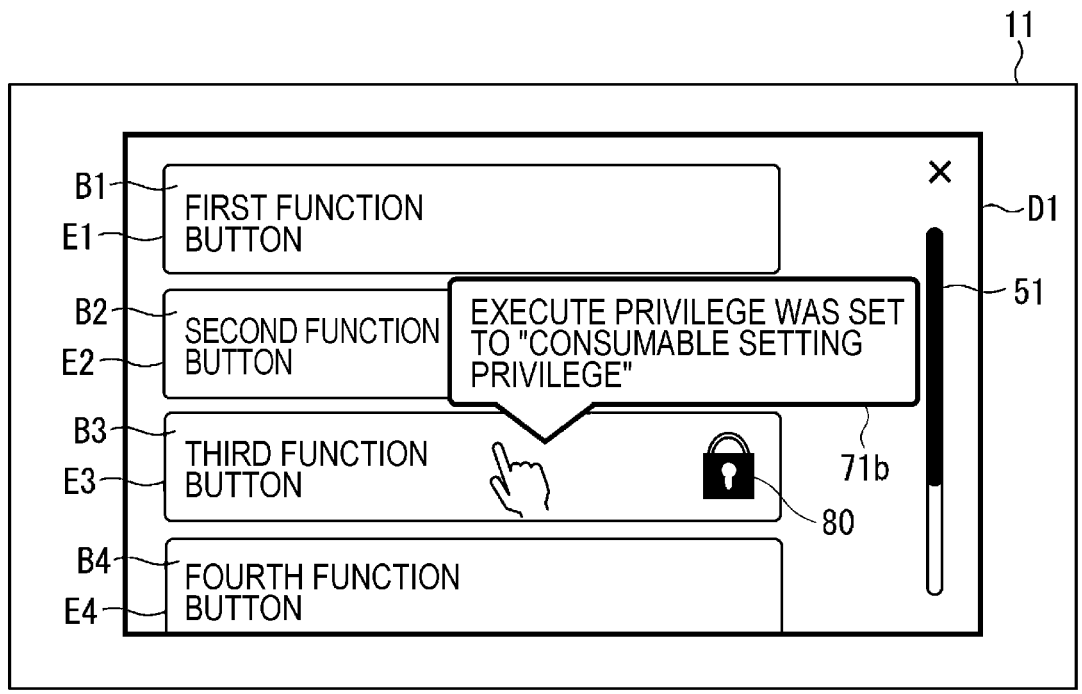
FIG. 14 is a diagram illustrating the first operation screen when long press is canceled while the function button is long pressed for equal to or more than three seconds and less than five seconds.

FIG. 14 is a diagram illustrating a display example of the first operation screen D1 when the long press is canceled while the long press time of the third function button B3 is equal to or more than three seconds and less than five seconds. In this case, the display controller 160 displays the second setting privilege information 71b indicating that the execute privilege is set to the "consumable setting privilege" on the first operation screen D1. When a fixed time passes from the display start of the second setting privilege information 71b, the display controller 160 hides the second setting privilege information 71b.

Figure 15:
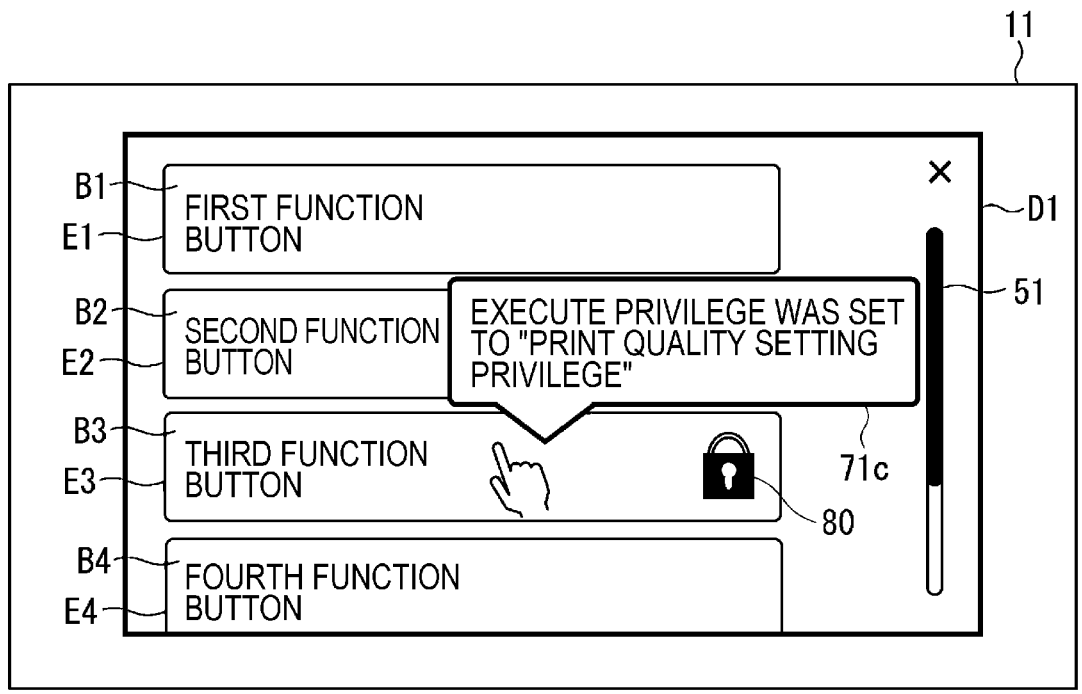
FIG. 15 is a diagram illustrating the first operation screen when long press is canceled while the function button is long pressed for equal to or more than five seconds and less than seven seconds.

FIG. 15 is a diagram illustrating a display example of the first operation screen D1 when the long press is canceled while the long press time of the third function button B3 is equal to or more than five seconds and less than seven seconds. In this case, the display controller 160 displays third setting privilege information 71c indicating that the execute privilege is set to "print quality setting privilege" on the first operation screen D1. When a fixed time passes from the display start of the third setting privilege information 71c, the display controller 160 hides the third setting privilege information 71c.

In this regard, when the long press is canceled after the long press time of the third function button B3 passed for equal to or more than seven seconds, the execute privilege is not set as illustrated by the second table T2 illustrated in FIG. 5, and thus the display controller 160 does not display the setting privilege information 71.

In this regard, the display controller 160 may hide the setting privilege information 71 not when a fixed time has passed from the display start of setting privilege information 71 but when a user has performed some operation on the operation screen D after the display start of the setting privilege information 71.

Figure 16:
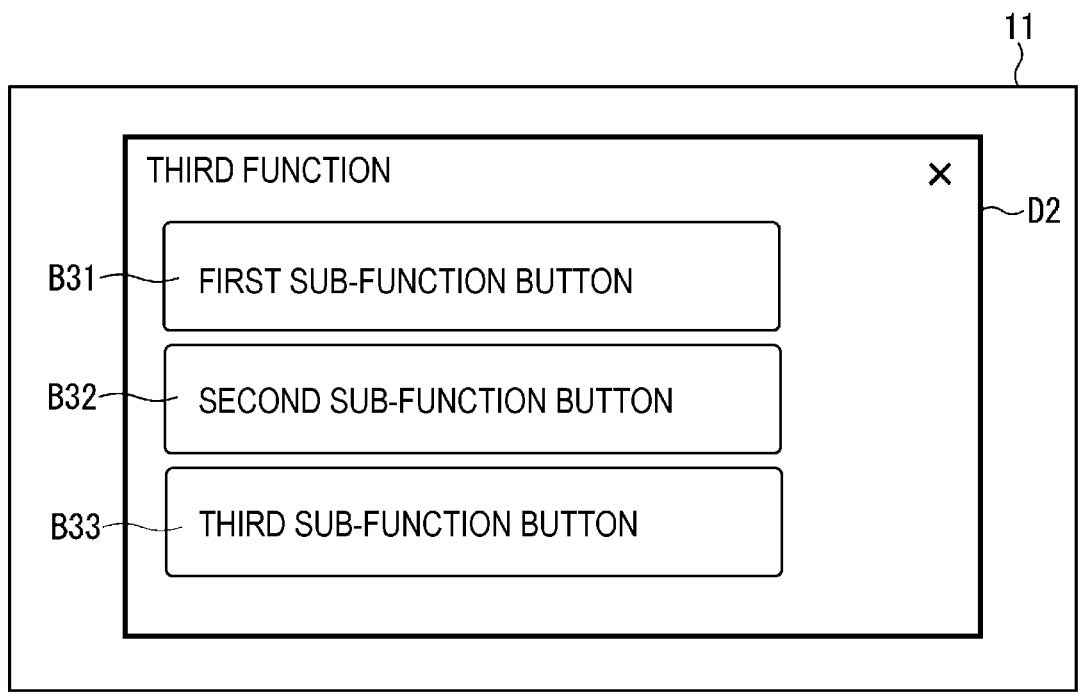
FIG. 16 is a display example of a second operation screen.

FIG. 16 is a diagram illustrating a display example of the second operation screen D2 that is displayed when the third function button B3 is short pressed on the first operation screen D1 illustrated in FIG. 9. In this regard, it is assumed that a user who has short pressed the third function button B3 on the first operation screen D1 has the execute privilege of the function assigned to the third function button B3.

The second operation screen D2 is a screen that is displayed by performing the third function assigned to the third function button B3, and is, for example, a print quality setting screen. A first sub-function button B31, a second sub-function button B32, and a third sub-function button B33 are displayed on the second operation screen D2 illustrated in FIG. 16.

In this regard, the first sub-function button B31 is, for example, a button for displaying a screen for performing image quality adjustment. Also, the second sub-function button B32 is, for example, a button for displaying a screen for performing color adjustment. Also, the third sub-function button B33 is, for example, a button for setting image resolution.

FIG. 17 is a diagram illustrating a display example of the first operation screen D1 when a user who does not have the administrator privilege long pressed the third function button B3, and the long press is canceled on the first operation screen D1 illustrated in FIG. 9. In this case, the display controller 160 displays the unable to set information 81 indicating that the execute privilege is unable to be set on the first operation screen D1. The unable to set information 81 is information indicating that a user who has performed the operation, that is to say, a user who has performed authentication operation does not have the administrator privilege. When a fixed time passes from the display start of the unable to set information 81, the display controller 160 hides the unable to set information 81.

FIG. 18 is a diagram illustrating a display example of the first operation screen D1 when a user who does not have the execute privilege of the third function short pressed the third function button B3, and the short press is canceled on the first operation screen D1 illustrated in FIG. 9. In this case, the display controller 160 displays unable to execute information 82 indicating that the function is unable to be executed on the first operation screen D1. The unable to execute information 82 is information indicating that a user who has performed the operation, that is to say, a user who has performed authentication operation does not have the execute privilege of the function assigned to the function button B. When a fixed time passes from the display start of the unable to execute information 82, the display controller 160 hides the unable to execute information 82.

In this regard, the display controller 160 may hide the unable to set information 81 not when a fixed time has passed from the start of the display of the unable to set information 81 but when some operation is performed by a user on the operation screen D. In the same manner, the display controller 160 may hide the unable to execute information 82 when some operation is performed by a user on the operation screen D after the start of the display of the unable to execute information 82.

A description will be given of the function button press-time processing performed by the image forming apparatus 1 with reference to the flowcharts of FIG. 19 and FIG. 20. The function button press-time processing is an example of the "control method of the image forming apparatus". The function button press-time processing is started by the trigger of the pressing of the function button B. In this regard, it is assumed that various tables T are already stored in the storage section 19 of the image forming apparatus 1 before starting the function button press-time processing. Also, it is assumed that the image forming apparatus 1 completed user authentication and already obtained the execute privilege held by the user who pressed the function button B before the function button press-time processing is started.

In step S01 in FIG. 19, the image forming apparatus 1 starts measuring a press time of the function button B.

In step S02, the image forming apparatus 1 waits for a fixed time. In this regard, the waiting time is shorter than the minimum time of the long press time, and, for example, about 0.1 seconds.

In step S03, the image forming apparatus 1 determines whether or not the press of the function button B is canceled. When the image forming apparatus 1 determines that the press of the function button B is canceled, the processing proceeds to step S07. Also, when the image forming apparatus 1 determines that the press of the function button B is not canceled, the processing proceeds to step S04.

In step S04, the image forming apparatus 1 searches for an execute privilege to display based on the press time of the function button B. The image forming apparatus 1 searches the second table T2 for an execute privilege associated with the press time of the function button B as an execute privilege to display.

In step S05, the image forming apparatus 1 determines whether or not the searched execute privilege is displayed. That is to say, the image forming apparatus 1 determines whether or not the execute privilege displayed as the setting guidance information 61 is identical to the searched execute privilege. When the image forming apparatus 1 determines that the searched execute privilege is displayed, the processing returns to step S02. Also, when the image forming apparatus 1 determines that the searched execute privilege is not displayed, the processing proceeds to step S06.

In step S06, the image forming apparatus 1 displays the searched execute privilege as the setting guidance information 61. Also, after the image forming apparatus 1 performs step S06, the processing returns to step S02.

In step S07, the image forming apparatus 1 ends measuring the press time of the function button B.

In step S08, the image forming apparatus 1 determines whether or not the function button B is long pressed. When the image forming apparatus 1 determines that the function button B has been long pressed, the processing proceeds to step S13 in FIG. 20. Also, when the image forming apparatus 1 determines that the function button B has not been long pressed, that is to say, determines that the function button B is short pressed, the processing proceeds to step S09.

In step S09, the image forming apparatus 1 determines whether or not the execute privilege is set to the function assigned to the pressed function button B. When the execute privilege is set in association with the function assigned to the pressed function button B in the fourth table T4, the image forming apparatus 1 determines that the execute privilege is set. When the image forming apparatus 1 determines that the execute privilege is set, the processing proceeds to step S10. Also, when the image forming apparatus 1 determines that the execute privilege is not set, the processing proceeds to step S11.

In step S10, the image forming apparatus 1 determine whether or not the user who pressed the function button B has the execute privilege of the function assigned to the pressed function button B. When the execute privilege of the function assigned to the pressed function button B is included in the execute privileges already obtained by the user in the fourth table T4, the image forming apparatus 1 determines that the user has the execute privilege of the function. When the image forming apparatus 1 determines that the user has the execute privilege, the processing proceeds to step S11. Also, when the image forming apparatus 1 determines that the user does not have the execute privilege, the processing proceeds to step S12.

In step S11, the image forming apparatus 1 performs the function assigned to the function button B. After performing step S11, the image forming apparatus 1 ends the function button press-time processing.

In step S12, the image forming apparatus 1 displays the unable to execute information 82. That is to say, the image forming apparatus 1 notifies the user that the function assigned to the pressed function button B is unable to be performed. After performing step S12, the image forming apparatus 1 ends the function button press-time processing.

In step S13 of FIG. 20, the image forming apparatus 1 determines whether or not the user who pressed the function button B has the administrator privilege. When the image forming apparatus 1 determines that the user has the administrator privilege, the processing proceeds to step S14. Also, when the image forming apparatus 1 determines that the user does not have the administrator privilege, the processing proceeds to step S17.

In step S14, the image forming apparatus 1 searches for an execute privilege to be set based on the press time of function button B. The image forming apparatus 1 searches the second table T2 for the execute privilege associated with the press time of the function button B as an execute privilege to set.

In step S15, the image forming apparatus 1 sets the searched execute privilege as the execute privilege of the function assigned to the function button B. The image forming apparatus 1 records the execute privilege of the set function in the fourth table T4.

In step S16, the image forming apparatus 1 displays the execute privilege set as the setting privilege information 71 with the lock image 80.

In step S17, the image forming apparatus 1 displays the unable to set information 81. That is to say, the image forming apparatus 1 notifies the user that the execute privilege is unable to be set. After performing step S17, the image forming apparatus 1 ends the function button press-time processing.

As described above, the image forming apparatus 1 according to the present embodiment sets the execute privilege of a function from a plural types of execute privileges in accordance with the long press time of the function button B, which performs a function by being short pressed. Thereby, the user is easily set the execute privilege of the function without using a dedicated screen for setting the execute privilege.

Also, the image forming apparatus 1 displays the setting privilege information 71 when the execute privilege is set by the execute privilege setting section 150, and thus is able to notify the user of the type of the set execute privilege.

Also, the image forming apparatus 1 displays the setting guidance information 61 while the function button B is long pressed, and thus when the long press of the function button B is canceled, it is possible to notify the user what type of execute privilege is set.

Also, the image forming apparatus 1 displays the lock image 80 in the button area E of the function button B, and thus it is possible to notify the user that the execute privilege of the function is set.

Also, when the execute privilege of the function is set by the execute privilege setting section 150, the image forming apparatus 1 determines whether or not to perform the function in accordance with the set execute privilege and the execute privilege of the user obtained by the execute privilege acquisition section 120. Thereby, the image forming apparatus 1 is able to permit only the user who has the execute privilege to perform the function.

Also, when the "administrator privilege" is not obtained by the execute privilege acquisition section 120 as the execute privilege, the image forming apparatus 1 does not set the execute privilege of the function even in a case in which the function button B is long pressed. Thereby, the image forming apparatus 1 is able to limit the user who sets the execute privilege to the administrator. In this regard, it is possible to employ the following variations regardless of the embodiment described above.

Variation 1

Figure 22:
FIG. 22 is a diagram illustrating another example of the third table.

In the embodiment described above, each of the long press times is associated with a corresponding one of the execute privileges in the second table T2 illustrated in FIG. 5. However, each of the long press times may be associated with a plurality of execute privileges. Also, in the embodiment described above, each user ID is associated with one or a plurality of execute privileges in the third table T3 illustrated in FIG. 6. However, each user ID may be associated with one execute privilege in principle. FIG. 21 is a diagram illustrating an example of the second table T2 according to the present variation. Also, FIG. 22 is a diagram illustrating an example of the third table T3 according to the present variation. When the second table T2 illustrated in FIG. 21 and the third table T3 illustrated in FIG. 22 are stored in the storage section 19 of the image forming apparatus 1, the relationship between the long press time of the function button B and the user who is able to perform the function becomes the same as that in the embodiment described above. That is to say, when the long press time of the function button B is equal to or more than one second and less than three seconds, a user with the user ID "A01", who has the "administrator privilege", is able to perform the function assigned to the function button B. Also, when the long press time of the function button B is equal to or more than three seconds and less than five seconds, a user with the user ID "A01" and a user with the user ID "B02", who have the "administrator privilege" or the "consumable setting privilege" are able to perform the function assigned to the function button B. Also, when the long press time of the function button B is equal to or more than five seconds and less than seven seconds, a user with the user ID "A01", a user with the user ID"B02", and a user with the user ID "C03", who have the "administrator privilege", the "consumable setting privilege", or the "print quality setting privilege", respectively are able to perform the function assigned to the button B. Also, when the long press time of the function button B is equal to or more than seven seconds, all the users are able to perform the function assigned to the button B regardless of the execute privilege held. In the present variation, when the function button B to which a function having the execute privilege set is assigned is pressed, and the execute privilege obtained by the execute privilege acquisition section 120 is included in the execute privilege set for the function, the function execution section 140 performs the function. On the other hand, when the function button B to which a function having the execute privilege set is assigned is pressed, and the execute privilege obtained by the execute privilege acquisition section 120 is not included in the execute privilege set for the function, the function execution section 140 does not perform the function. In this regard, in the second table T2 illustrated in FIG. 21, the setting is performed such that the number of execute privileges increases as the long press time becomes longer. However, the setting may be performed such that the number of execute privileges may decrease as the long press time becomes longer.

Variation 2

Figure 23:
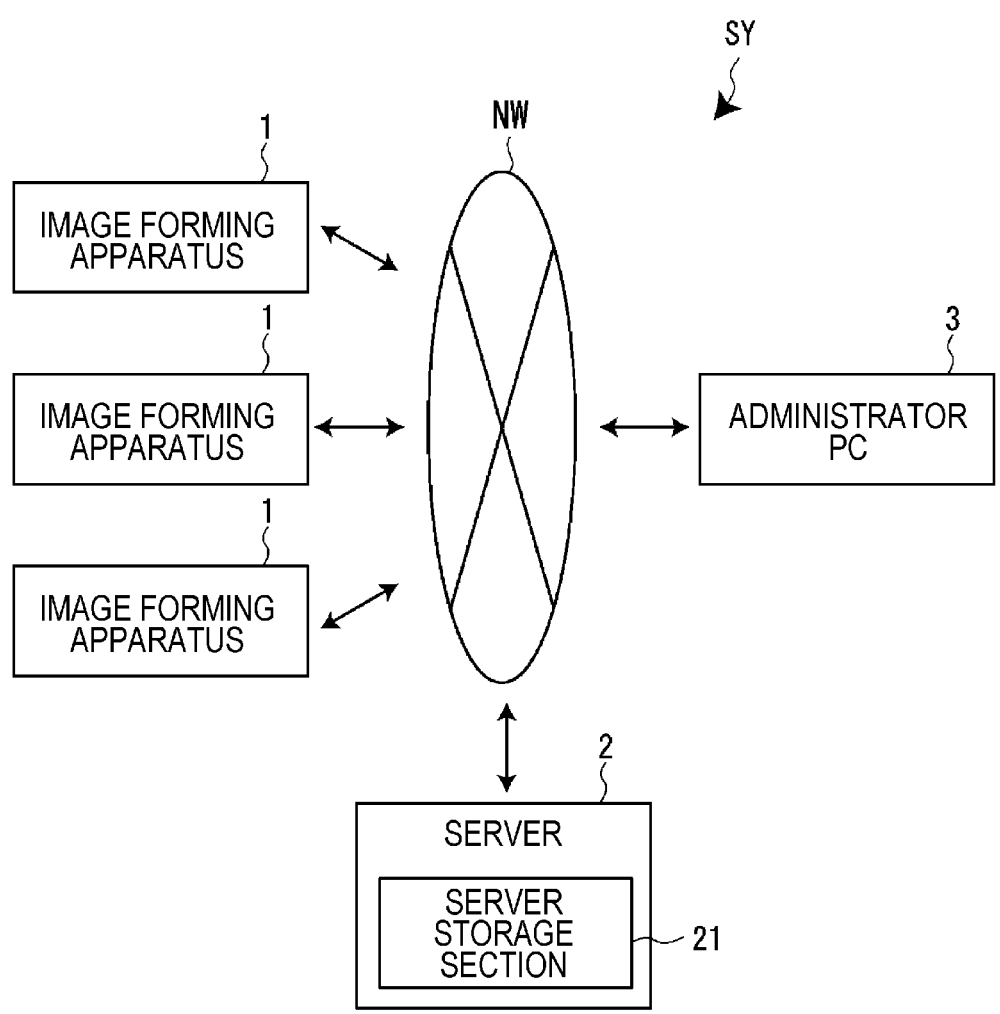
FIG. 23 is a diagram illustrating another example of the image forming system.

In the embodiment described above, the image forming apparatus 1 stores various tables T in the storage section 19. However, a server 2 configured to communicate with the image forming apparatus 1 may store various tables T. FIG. 23 is a diagram illustrating an image forming system SY according to the present variation. The image forming system SY according to the present variation includes a plurality of image forming apparatuses 1, the server 2, and the administrator PC 3, which are connected with each other via a network NW. The server 2 is configured to communicate with the plurality of image forming apparatuses 1 and controls the plurality of image forming apparatuses 1 in an integrated manner. Also, the server 2 includes a server storage section 21 storing the various tables T illustrated in FIG. 3. The administrator PC 3 creates the first table T1, the second table T2, and the third table T3 and transmits the created tables T to the server 2. In this regard, when the administrator PC 3 is accessible to the server storage section 21 of the server 2, the administrator PC 3 may directly rewrite the information in the tables T. In the present variation, the image forming apparatus 1 refers to the tables T stored in the server storage section 21 of the server 2 and performs the function button press-time processing. Also, the execute privilege of the function set by the execute privilege setting section 150 of the image forming apparatus 1 is recorded in the fourth table T4 in the server storage section 21. With the present variation, it is not necessary for the administrator to create the tables T for each of the image forming apparatuses 1 and to set the execute privilege for each of the image forming apparatuses 1. Accordingly, it is possible to greatly reduce the time and effort for creating the tables T and setting the execute privileges. In this regard, the image forming apparatus 1 may store a part of the tables T among the authentication table T0, the first table T1, the second table T2, the third table T3, and the fourth table T4, and the server 2 may store the other tables T as a further variation.

Variation 3

In the embodiment described above, the administrator creates the first table T1, the second table T2, and the third table T3 by using the administrator PC 3. However, it may be possible for the administrator to create these tables T by operating the image forming apparatus 1.

Variation 4

In the embodiment described above, the first table T1 illustrated in FIG. 4 includes the "administrator privilege", the "consumable setting privilege", and the "print quality setting privilege" as types of the execute privilege. However, the settable types of execute privileges are not limited to these. For example, the first table T1 may include an execute privilege indicating a department, such as "general affairs department", "sales department", "division", and the like as the types of execute privileges. Also, the first table T1 may include an execute privilege indicating a post, such as "department manager", "section chief", "subsection chief", and the like as the types of the execute privileges.

Variation 5

In the embodiment described above, the display controller 160 displays the same lock image 80 as a set image regardless of the execute privilege set. However, the display controller 160 may display a different lock image 80 in accordance with the execute privilege set. For example, the display controller 160 may display a different color lock image 80 in accordance with the execute privilege set.

Variation 6

In the embodiment described above, the authentication section 110 performs user authentication by reading an authentication card. However, user authentication may be performed by the other methods. For example, the authentication section 110 may perform user authentication by receiving input of a user ID and a password. Also, the authentication section 110 may perform user authentication by biometric authentication, such as face authentication, fingerprint authentication, or the like.

Variation 7

In the embodiment described above, the image forming apparatus 1 is assumed to be, for example, a complex machine. However, the image forming apparatus 1 may be a machine other than a complex machine, such as a printer, a scanner, a copy machine, or the like. Also, the embodiment described above may be applied to an electronic device other than the image forming apparatus 1. For example, the embodiment described above may be applied to a shared equipment, which displays the operation screen D including the function button B and is shared by a plurality of users.

Also, the shared equipment may be a projector. In this case, the operation screen D is projected by a projection section of the projector. Also, the pressing of the function button B displayed on the screen D is performed by using a remote controller that operates the projector, or the like. The remote controller is provided with direction keys including an up movement key, a down movement key, a right movement key, and a left movement key, and a selection key. A user moves a pointer displayed on the operation screen D in the button area E of the function button B to press by using the direction key, and performs the press operation of the function button B by pressing the selection key. In this case, the projector measures the press time of the selection key as the press time of the function button B.

Variation 8

In the flowcharts illustrated in FIG. 19 and FIG. 20, a determination of whether or not the user who has pressed the function button B has the execute privilege of the function assigned to the pressed function button B in step S10 may be made immediately after the pressing of the function button B. In this case, when the image forming apparatus 1 determines that the user has the execute privilege, the image forming apparatus 1 starts measuring the press time in step S01. Whereas when the image forming apparatus 1 determines that the user does not have the execute privilege, the image forming apparatus 1 ought to display the unable to execute information in step S12. Also, a determination of whether or not the user who pressed the function button B has the administrator privilege in step S13 may be made when the long press time has passed the minimum time of the long press time. In this case, when the image forming apparatus 1 determines that the user has the administrator privilege, the processing ought to proceed to the determination processing of whether or not the press of the function button B is canceled in step S03, whereas when the image forming apparatus 1 determines that the user does not have the administrator privilege, the processing ought to proceed to the display of unable to set information in step S17.

Variation 9

In this regard, in the embodiment described above and each variation, the descriptions of press, long press, short press, or the like of the function button B is conveniently used. However, these descriptions represents that the user touches on the function button B when operating by using a finger on the touch panel 11 as a matter of course. Also, in the embodiment described above, it is assumed that the function button B is a button to perform a function by being short pressed. However, continuous press, such as long press, double tap, or the like may be used for performing a function. For example, when the function button B is a button to perform a function by being long pressed, the image forming apparatus 1 ought to perform the function, for example, in a case in which the long press is less than a fixed time, such as less than three seconds, or the like, whereas when the long press is equal to or longer than a fixed time, the image forming apparatus 1 ought to set execute privilege based on the second table T2. In addition, various changes may be made without departing from the spirit and the scope of the disclosure.

APPENDIXES

Hereinafter appendixes are given on the image forming apparatus, the shared equipment, the image forming system, and the control method of an image forming apparatus.

An image forming apparatus 1 includes: a display controller 160 that displays an operation screen D including a function button B for executing a function on a touch panel 11; and an execute privilege setting section 150 that sets an execute privilege of the function from a plurality of types of execute privileges in accordance with a long press time of the function button B.

A shared equipment includes: a display controller 160 that displays an operation screen D including a function button B for executing a function on a touch panel 11; a press determination section 130 that determines whether the function button B is short pressed or long pressed; when the press determination section 130 determines that the function button B is short pressed, a function execution section 140 that executes the function; and when the press determination section 130 determines that the function button B is long pressed, an execute privilege setting section 150 that sets an execute privilege of the function from a plurality of types of execute privileges in accordance with a long press time of the function button B.

An image forming system SY includes an image forming apparatus 1 and a server 2 connected to the image forming apparatus 1 so as to be configured to communicate with the image forming apparatus 1, the image forming apparatus 1 including: a display controller 160 that displays an operation screen D including a function button B for executing a function on a touch panel 11; a press determination section 130 that determines whether the function button B is short pressed or long pressed; when the press determination section determines that the function button B is short pressed, a function execution section 140 that executes the function; and when the press determination section determines that the function button B is long pressed, an execute privilege setting section 150 that sets an execute privilege of the function from a plurality of types of execute privileges in accordance with a long press time of the function button B, the server 2 including a server storage section 21 that stores an execute privilege of the function set by the execute privilege setting section 150.

There is provided a control method of an image forming apparatus 1, the control method causing the image forming apparatus 1 to execute the processing including: displaying an operation screen D including a function button B for executing a function on a touch panel 11; determining whether the function button B is short pressed or long pressed; when a determination is made that the function button B is short pressed, executing the function; and when a determination is made that the function button B is long pressed, setting an execute privilege of the function from a plurality of types of execute privileges in accordance with a long press time of the function button B.

With this configuration, the image forming apparatus 1 sets the execute privilege of the function in accordance with the long press time of the function button B for performing the function from a plurality of types of execute privileges. Thereby, the user is able to easily set the execute privilege of the function without using a dedicated screen for setting the execute privilege.

In the image forming apparatus 1 described above, when long press of the function button B is canceled, the display controller 160 may display setting privilege information 71 indicating a type of the execute privilege set by the execute privilege setting section 150 on the touch panel 11.

With this configuration, the image forming apparatus 1 is able to notify the user of the type of the execute privilege set by displaying the setting privilege information 71 on the touch panel 11.

In the image forming apparatus 1 described above, when the long press time of the function button B is equal to or more than a first time and less than a second time, the execute privilege setting section 150 may set a first execute privilege, and when the long press time of the function button B is equal to or more than the second time and less than a third time, the execute privilege setting section 150 may set a second execute privilege different from the first execute privilege, and while the long press time of the function button B is equal to or more than the first time and less than the second time, the display controller 160 displays setting guidance information 61 indicating that the first execute privilege is set on the touch panel 11, and while the long press time of the function button B is equal to or more than the second time and less than the third time, the display controller displays setting guidance information 61 indicating that the second execute privilege is set on the touch panel 11.

With this configuration, the image forming apparatus 1 is able to notify the user what type of execute privilege is set when the long press of the function button B is canceled by displaying the setting guidance information 61 on the touch panel 11.

In the image forming apparatus 1 described above, when an execute privilege of the function is set by the execute privilege setting section 150, the display controller 160 may display a lock image 80 indicating that the execute privilege of the function is set in a button area of the function button B.

With this configuration, the image forming apparatus 1 is able to notify the user that the execute privilege of the function is set by displaying the lock image 80 in the button area of the function button B.

The image forming apparatus 1 described above further includes: an authentication section 110 that authenticates a user; a press determination section 130 that determines whether the function button B is short pressed or long pressed; when the press determination section 130 determines that the function button B is short pressed, a function execution section 140 that executes the function; and an execute privilege acquisition section 120 that refers to a table associating the user and the execute privilege and acquires the execute privilege associated with the user authenticated by the authentication section 110. When the press determination section 130 determines that the function button B is long pressed, the execute privilege setting section 150 sets an execute privilege of the function in accordance with a long press time of the function button B, and when the execute privilege of the function is set by the execute privilege setting section 150, the function execution section 140 determines whether or not to execute the function by a short press of the function button B in accordance with the set execute privilege and the execute privilege acquired by the execute privilege acquisition section 120.

With this configuration, the image forming apparatus 1 is able to perform the function by the function button B being short pressed. Also, the image forming apparatus 1 is able to limit a user who performs the function to a user who has the execute privilege set for the function.

In the image forming apparatus 1 described above, when a predetermined execute privilege is acquired by the execute privilege acquisition section 120, the execute privilege setting section 150 may set an execute privilege of the function in accordance with the long press time of the function button B, and when the predetermined execute privilege is not acquired by the execute privilege acquisition section 120, the execute privilege setting section 150 may not set the execute privilege of the function even in a case in which the function button B is long pressed.

With this configuration, the image forming apparatus 1 is able to limit a user who sets the execute privilege to a user who has a predetermined execute privilege.

What is claimed is:

1. An image forming apparatus, comprising:
    a display controller that displays an operation screen including a function button for executing a function on a display section; and
    an execute privilege setting section that sets one of a first execute privilege or a second execute privilege of the function from a plurality of types of execute privileges in accordance with a long press time of the function button, wherein
    when the long press time of the function button is equal to or more than a first time and less than a second time, the execute privilege setting section sets the first execute privilege of the plurality of types of execute privileges,
    when the long press time of the function button is equal to or more than the second time and less than a third time, the execute privilege setting section sets the second execute privilege different from the first execute privilege, and
    the plurality of types of execute privileges includes the second execute privilege.

2. The image forming apparatus according to claim 1, wherein
    when long press of the function button is canceled, the display controller displays setting privilege information indicating a type of one of the first execute privilege or the second execute privilege set by the execute privilege setting section on the display section.

3. The image forming apparatus according to claim 1, wherein
    while the long press time of the function button is equal to or more than the first time and less than the second time, the display controller displays setting guidance information indicating that the first execute privilege is set on the display section, and
    while the long press time of the function button is equal to or more than the second time and less than the third time, the display controller displays the setting guidance information indicating that the second execute privilege is set on the display section.

4. The image forming apparatus according to claim 1, wherein
    when one of the first execute privilege or the second execute privilege of the function is set by the execute privilege setting section, the display controller displays a set image indicating that the one of the first execute privilege or the second execute privilege of the function is set in a button area of the function button.

5. The image forming apparatus according to claim 1, further comprising:
    an authentication section that authenticates a user;
    a press determination section that determines whether the function button is short pressed or long pressed;
    when the press determination section determines that the function button is short pressed, a function execution section that executes the function; and
    an execute privilege acquisition section that refers to a table associating the user and a specific execute privilege of the plurality of types of execute privileges, and acquires the specific execute privilege associated with the user authenticated by the authentication section, wherein when the press determination section determines that the function button is long pressed, the execute privilege setting section sets one of the first execute privilege or the second executive privilege of the function in accordance with the long press time of the function button, and when one of the first execute privilege or the second execute privilege of the function is set by the execute privilege setting section, the function execution section determines whether or not to execute the function by a short press of the function button in accordance with one of the set first execute privilege or the set second executive privilege, and the specific execute privilege acquired by the execute privilege acquisition section.

6. The image forming apparatus according to claim 5, wherein when the specific execute privilege is acquired by the execute privilege acquisition section, the execute privilege setting section sets one of the first execute privilege or the second execute privilege of the function in accordance with the long press time of the function button, and when the specific execute privilege is not acquired by the execute privilege acquisition section, the execute privilege setting section does not set one of the first execute privilege or the second execute privilege of the function even in a case in which the function button is long pressed.

7. A shared equipment, comprising:

a display controller that displays an operation screen including a function button for executing a function on a display section;

a press determination section that determines whether the function button is short pressed or long pressed;

when the press determination section determines that the function button is short pressed, a function execution section that executes the function; and when the press determination section determines that the function button is long pressed, an execute privilege setting section that sets one of a first execute privilege or a second execute privilege of the function from a plurality of types of execute privileges in accordance with a long press time of the function button, wherein when the long press time of the function button is equal to or more than a first time and less than a second time, the execute privilege setting section sets the first execute privilege of the plurality of types of execute privileges, when the long press time of the function button is equal to or more than the second time and less than a third time, the execute privilege setting section sets the second execute privilege different from the first execute privilege, and the plurality of types of execute privileges includes the second execute privilege.

8. An image forming system comprising an image forming apparatus and a server connected to the image forming apparatus so as to be configured to communicate with the image forming apparatus, the image forming apparatus including:

a display controller that displays an operation screen including a function button to execute function on a display section;

a press determination section that determines whether the function button is short pressed or long pressed;

when the press determination section determines that the function button is short pressed, a function execution section that executes the function; and when the press determination section determines that the function button is long pressed, an execute privilege setting section that sets an execute privilege of the function from a plurality of types of execute privileges in accordance with a long press time of the function button, and the server including a server storage section that stores the execute privilege of the function set by the execute privilege setting section.

9. A control method of an image forming apparatus, the control method causing the image forming apparatus to execute operations comprising:

displaying an operation screen including a function button for executing a function on a display section;

determining whether the function button is short pressed or long pressed;

when a determination is made that the function button is short pressed, executing the function; and when a determination is made that the function button is long pressed, setting one of a first execute privilege or a second execute privilege of the function from a plurality of types of execute privileges in accordance with a long press time of the function button, wherein when the long press time of the function button is equal to or more than a first time and less than a second time, setting the first execute privilege of the plurality of types of execute privileges, when the long press time of the function button is equal to or more than the second time and less than a third time, setting the second execute privilege different from the first execute privilege, and the plurality of types of execute privileges includes the second execute privilege.

10. An image forming apparatus, comprising:

a display controller that displays an operation screen including a function button to execute a function on a display section;

an execute privilege setting section that sets an execute privilege of the function from a plurality of types of execute privileges in accordance with a long press time of the function button;

an authentication section that authenticates a user;

a press determination section that determines whether the function button is short pressed or long pressed;

when the press determination section determines that the function button is short pressed, a function execution section that executes the function; and an execute privilege acquisition section that refers to a table associating the user and the execute privilege and acquires the execute privilege associated with the user authenticated by the authentication section, wherein when the press determination section determines that the function button is long pressed, the execute privilege setting section sets the execute privilege of the function in accordance with the long press time of the function button, and when the execute privilege of the function is set by the execute privilege setting section, the function execution section determines whether or not to execute the function by a short press of the function button in accordance with the set execute privilege and the acquired execute privilege by the execute privilege acquisition section.

* * * * *